United States Patent [19]
Roden

[11] Patent Number: 5,152,349
[45] Date of Patent: Oct. 6, 1992

[54] COULTER ASSEMBLY FOR DEEP TILLAGE APPARATUS

[76] Inventor: Thomas V. Roden, 215 North Spring Rd., Port Washington, Wis. 53074

[21] Appl. No.: 625,315

[22] Filed: Dec. 10, 1990

[51] Int. Cl.$^5$ ..................... A01B 35/18; A01B 35/28
[52] U.S. Cl. .................... 172/177; 172/181; 172/574; 111/139
[58] Field of Search ............... 111/163, 164, 165, 166, 111/168, 169, 140, 139; 172/144, 166, 175, 177, 176, 181, 196, 624.5, 642, 686, 574, 180

[56] References Cited

U.S. PATENT DOCUMENTS

| | | | |
|---|---|---|---|
| 1,622,968 | 3/1927 | Orthman | 172/181 X |
| 1,639,307 | 8/1927 | Neu | 172/574 X |
| 2,601,019 | 6/1952 | Hollandsworth | 172/144 X |
| 2,777,376 | 1/1957 | Schwegler | 172/166 X |
| 3,052,306 | 9/1962 | Lynch | 172/181 X |
| 4,057,112 | 11/1977 | Taylor | 172/166 |
| 4,203,494 | 5/1980 | Hansen | 172/166 |
| 4,245,706 | 1/1981 | Dietrich, Sr. | 172/180 |
| 4,295,532 | 10/1981 | Williams et al. | 172/574 X |
| 4,425,973 | 1/1984 | Williams et al. | 172/574 |
| 4,535,849 | 8/1985 | Dietrich, Sr. | 172/166 X |
| 4,553,607 | 11/1985 | Behn et al. | 172/624.5 X |
| 4,785,890 | 11/1988 | Martin | 111/139 X |
| 4,947,770 | 8/1990 | Johnston | 172/166 X |

Primary Examiner—Randolph A. Reese
Assistant Examiner—Jeffrey L. Thompson
Attorney, Agent, or Firm—Emrich & Dithmar

[57] ABSTRACT

A primary tillage apparatus includes a plurality of primary tillage tools and a coulter assembly for each primary tillage tool including first and second coulters positioned directly forward of the primary tillage tool, the coulters being mounted to diverge in a v-shape relative to the direction of travel such that the separation between the edges of the coulters increases in a rearward direction, and concave working surfaces of the coulters face outwardly away from one another, the weight of the implement frame and the action of the primary tillage tools causing the coulters to penetrate the soil ahead of the tillage tool and to press into any residue encountered, the cutting edges of the coulters gripping the residue and drawing the residue outwardly in opposite directions, tearing the residue in two and clearing the residue to the sides and out of the path of the primary tillage tool located rearwardly of the coulter assembly.

10 Claims, 2 Drawing Sheets

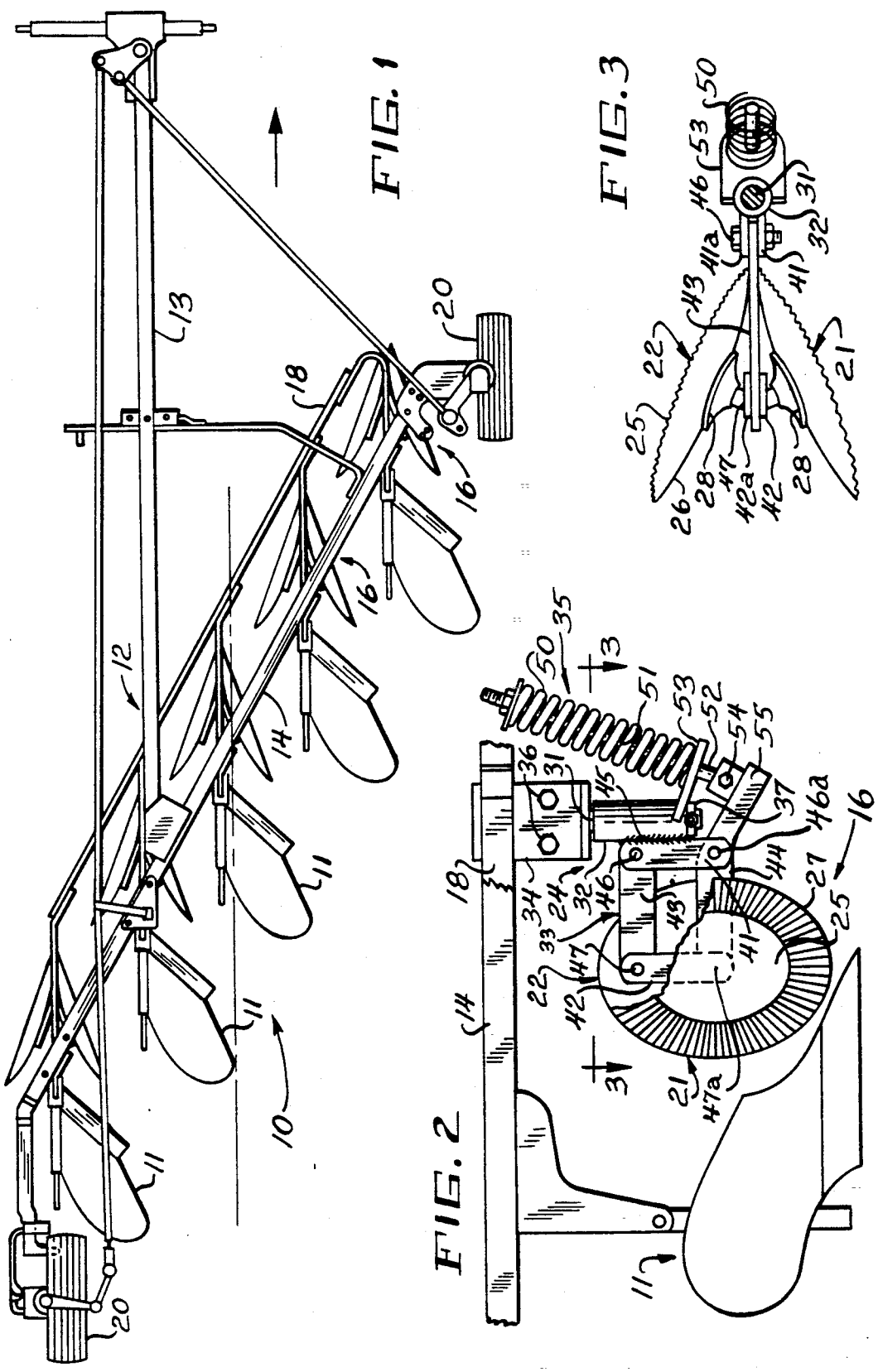

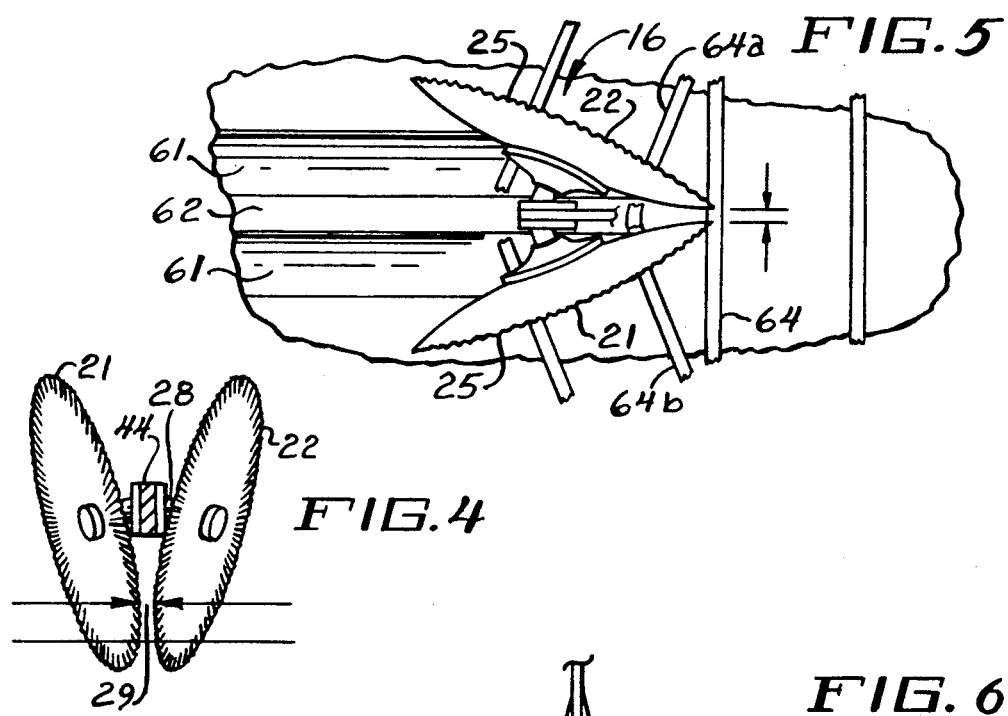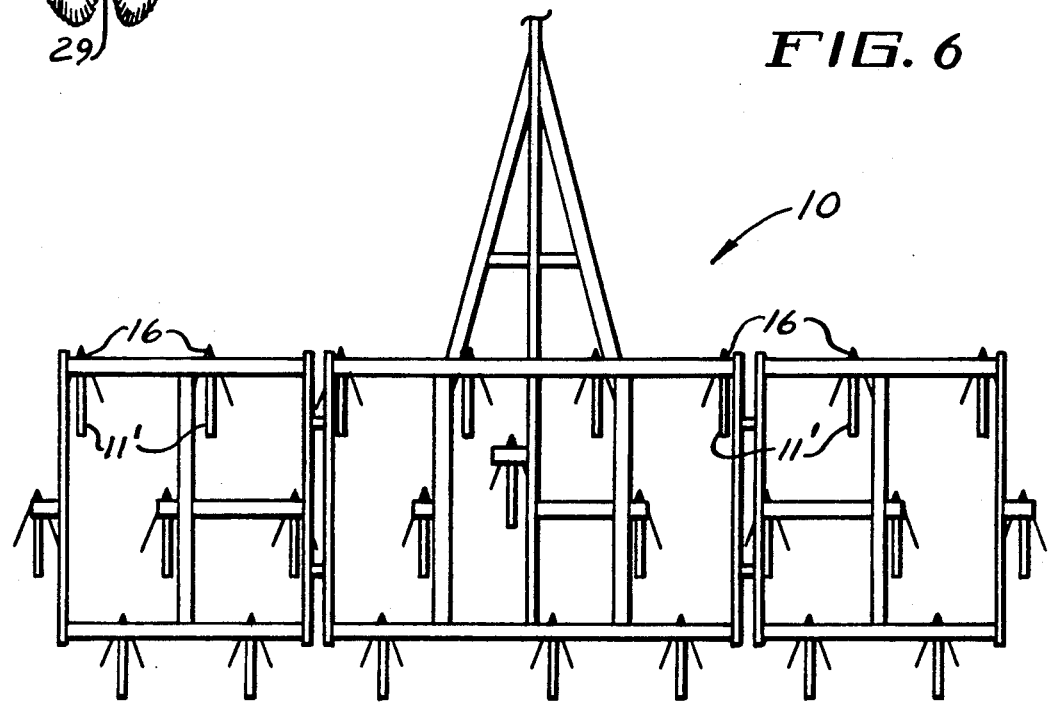

COULTER ASSEMBLY FOR DEEP TILLAGE APPARATUS

BACKGROUND OF THE INVENTION

This invention relates to primary tillage apparatus, and more particularly, to a coulter assembly for use with primary tillage apparatus for cutting and clearing residue from the path of primary tillage tools.

As used herein, the term "primary tillage tools" includes moldboard plows, chisel plows, and wide-sweep plows, as well as subsoilers, chisels and rippers. The term is not intended to include disk tillers or rotary tillers.

As used herein, primary tillage tools refers to tillage tools such as moldboard plows, chisel plows and other subsoilers which work the soil to a depth of at least eight inches. When a field being tilled contains severe crop residue, such as cornstalks, sugarcane, or the like, the tillage tools become entangled or blocked up with the trash which straddles the shank and is dragged along, greatly increasing the drag force on the implement. When residue accumulates and affects operation, the farmer must stop the tractor and clear the residue from the tillage tools, which is not only annoying to the farmer but also makes for inefficient tillage.

One attempt to alleviate this problem has been the addition of a single conventional coulter ahead of one or more of the tillage tools to cut the residue in the path of the tillage tool. This arrangement is not particularly successful because the stalks are merely cut and are not removed from the path. Further, if the coulters are canted, they add side draft to the tillage apparatus, an undesirable side effect.

Accordingly, it is common practice to employ stalk choppers which are pulled through the field to cut the trash residue. However, there are significant drawbacks with this practice. A primary disadvantage is that the use of a stalk chopper requires an additional pass through the field, resulting in increased operating costs to the farmer, particularly in the form of fuel expenses. Moreover, the requirement that the farmer own and maintain a separate stalk chopping implement further increases operating costs.

Accordingly, it would be desirable to have a tillage apparatus for primary tillage applications which is substantially free of being blocked up under severe residue conditions and which is not characterized by increased side draft in use.

SUMMARY OF THE INVENTION

Therefore, it is an object of the present invention to provide an improved apparatus for primary tillage.

It is another object of the invention to provide a apparatus for primary tillage apparatus which is substantially free from being blocked up by severe residue and which is not characterized by increased side draft.

These and other objects are achieved by the present invention which provides a primary tillage apparatus including a frame and a plurality of primary tillage tools mounted to the frame. Each tillage tool is positioned to work soil being worked by the tillage apparatus. The apparatus includes a coulter assembly including first and second fluted coulters mounted to the frame in a V-shaped arrangement and positioned directly forward of each primary tillage tool. The weight of the frame and the net downward force of the primary tillage tools cooperate to cause the coulters to penetrate the soil ahead of the tillage tool. The first and second coulters are constructed and arranged to grip residue crossed by the coulters and to press it into the ground, as the coulters pass over the residue, the spreading action of the V-shape of the coulter pair draws residue outwardly, tearing apart the residue and clearing the residue out of the path of the tillage tool.

In accordance with a preferred embodiment, each of the coulters has a concave working surface and a serrated or fluted cutting edge. The concave working surfaces of the coulters are directed outwardly, away from one another and towards opposite sides of the apparatus. The coulters are supported at an angle relative to one another such that the separation between the coulters increases in a direction opposite to the direction of travel of the apparatus forming the V-shape arrangement mentioned above. The coulters are angled so that the point of minimum separation between the edges of the coulters is slightly above the point at which the coulters enter the ground. As the coulters press downwardly into the residue, they grip the residue, and by virtue of the divergence of their cutting edges, the coulters tear the residue apart and clear it outwardly out of the path of the tillage tool.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

For the purpose of facilitating and understanding the invention, there is illustrated in the accompanying drawings a preferred embodiment thereof, from an inspection of which, when considered in connection with the following description, the invention, its construction and operation, and many of its advantages will be readily understood and appreciated.

FIG. 1 is a top plan view of a simplified representation of a primary tillage apparatus including a plurality of moldboard plows, each having associated therewith a coulter assembly provided in accordance with the present invention;

FIG. 2 is a side elevational view of a moldboard plow and a coulter assembly provided by the present invention;

FIG. 3 is a top plan view of the coulter assembly illustrated in FIG. 2;

FIG. 4 is a simplified front view of the coulter assembly, illustrating the spacing between the forward edges of the coulters;

FIG. 5 is a schematic representation of the coulter assembly illustrating its operation in tearing residue; and FIG. 6 is a simplified representation of a primary tillage apparatus including a plurality of subsoilers each having associated therewith a coulter assembly provided in accordance with the present invention.

DESCRIPTION OF THE PREFERRED EMBODIMENTS

Referring to FIG. 1, there is shown a simplified representation of a primary tillage apparatus indicated generally at 10, which includes a plurality of primary tillage tools 11, each having associated therewith a coulter assembly 16 provided by the present invention.

In FIG. 1, the tillage tools are moldboard plows, but the coulter assembly provided by the present invention can be used with any type of primary tillage apparatus including chisel plows and other subsoilers, for example. Moreover, the coulter assembly may be retrofit to existing primary tillage apparatus.

The moldboard plows 11 are mounted to a suitable frame 12 which includes an elongated main beam 13 and a cross beam 14. A plurality of the coulter assemblies 16 are mounted to a further frame member 18, which is mounted to main frame 14 and spaced forwardly thereof. A coulter assembly 16 is associated with each moldboard plow 11 and is mounted directly ahead of its associated moldboard plow 11.

The apparatus includes a pair of support wheels 20, which may raise and lower the plow relative to the ground. Thus, the plow may be raised for transport or lowered to the working position whereby the weight of the frame and the downward force of the tools as they are drawn through the soil drive the coulters into the soil. At the forward end of the frame 12 there is a conventional three point hitch which is adapted to couple the front of the implement frame 12 to a conventional traction vehicle. Alternatively, the plow could be mounted by a conventional three-point hitch.

The apparatus is adapted to be drawn in the direction of the arrow shown in FIG. 1. As in agricultural equipment, the terms "right" and "left" refer, respectively, to the right and left sides of an operator seated in the tractor and facing the direction of travel. The term "forwardly" refers to the forward direction of travel of the tractor and the implement drawn by the tractor.

Referring to FIGS. 2-5, each coulter assembly 16 includes first and second fluted coulters, 21 and 22 which are coupled to frame member 18 of the frame 12 by a coupling assembly 24. Coulters 21, 22 may be the type normally used in no-till farming operations. Thus, each of the coulters 21 and 22 has a concave work surface 25 and a convex surface 26, with the concave work surfaces being directed outwardly away from one another. Each of the coulters 21 and 22 has a sharp serrated peripheral edge 27 to enhance the gripping and holding of residue, as will be described. Each of the coulters has a mounting hub 28 including a suitable bearing for permitting rotating movement of the coulters. The coulters may be twenty-two inches in diameter.

The coupling assembly 24 includes an upright mast or shaft 31, a collar 32 rotatably mounted on the shaft, a parallel linkage 33, a mounting bracket 34 and a reset mechanism 35. The shaft 31 is rigidly attached to the frame member 18 by the mounting bracket 34 which is secured to frame member 18 by bolts 36. Collar 32 is mounted on the shaft 31 for rotation thereon. A suitable stop member 37 maintains the collar on the shaft.

The parallel linkage 33 includes link members 41, 41a, 42, 42a, 43 and 44. Link members 41 and 41a are oriented vertically and secured to the collar 32 in a suitable manner, such as by weld 45. Link members 43 and 44 are oriented horizontally in spaced relationship, with link member 43 located above link member 44. The forward ends of the link members extend between and are pivotally connected to link members 41 and 41a at pivot points 46 and 46a. The rearward ends of the upper and lower link members 43 and 44 extend between and are interconnected by link members 42 and 42a which are oriented vertically and are pivotally connected to the rearward ends of link members 43 and 44 at pivot points 47 and 47a. The separation between the link forward pivot point 46 and 46a and the link rearward pivot points 47 and 47a is the same so that a fixed spacing is maintained between the upper link member 43 and the lower link member 44. Link members 43 and 44 extend rearwardly in cantilevered fashion from the collar 32 and support the pair of coulters 21 and 22 rearwardly of the shaft 31. The coulters 21 and 22 have their hubs 28 connected to the lower link at pivot point 47a.

The reset mechanism 35 is conventional and includes spring 50 encircling a spring rod 51. The lower end 52 of the rod 51 passes through an aperture in a bearing plate 53 and is pivotally connected at pivot point 54 to the lower link member 43 by an extension 55 thereof.

The coulter assembly 16 is mounted directly ahead of its associated tillage tool 11 to clear residue from the path of the tillage tool. The concave work surfaces 25 face outwardly and move soil outwardly, forming channels or troughs, but do not turn the soil. The coulters are constructed and arranged to grip and tear residue crossed by the coulters, drawing outwardly residue which is simultaneously crossed by both coulters, tearing apart the residue and clearing the residue to the sides and out of the path of the associated tillage tool 11.

More specifically, the coulters 21 and 22 are angled or canted in a V-shape to diverge rearwardly. That is, the separation between the coulters increases in the direction opposite to the direction of travel of the apparatus, as shown in FIG. 3. At their forward edges, the coulters are spaced apart with minimum separation occurring at a point, indicated generally by the reference numeral 29, below a plane containing the pivot axes of the coulters, but approximately three inches above ground, as shown in FIG. 4. When the frame is lowered to a ground engaging position, the coulters are driven into the ground by the weight of the frame and the action of the tools. Under average soil conditions, the coulters penetrate to a depth of about four inches. The depth of penetration of the coulters changes with soil conditions. The coulters will be driven deeper into soft soil or lighter soils and penetrate less in hard soil. This self-adjusting feature is desirable because residue is harder to cut in soft soil, and the coulters will drive the residue deeper into soft soil.

As illustrated in FIGS. 2, 3 and 4, the coulters do not overlap. The coulters are oriented in mirror image symmetry about a center line running between the coulter. By virtue of their symmetrical orientation, the coulters are self-aligning as they are drawn through the soil and they do not create a side draft on the implement.

Referring to FIG. 5, there is shown a simplified representation of a coulter assembly 16, illustrating its operation in tearing residue, such as cornstalks, and clearing a path for its associated tillage tool (not shown in FIG. 5). The concave work surface 25 of each coulter moves soil outwardly forming a channel or groove 61, but leaving a center ridge 62 which is worked by the tillage tool. The coulters 21 and 22 grip and tear apart residue in their path and clear it out of the path of its associated tillage tool. As the coulters 21 and 22 engage a cornstalk diagrammatically illustrated at 64, their sharp serrated peripheral edges 27 are driven into the cornstalk, the points of the serrations penetrating the residue. As the coulter assembly moves forward the coulters separate as they roll over the cornstalk, tearing it apart into two sections 64a, 64b. The coulters may be set at an angle of about 20° relative to the direction of travel.

Referring to FIGS. 2 and 4, because the upper and lower links 43 and 44 are spaced apart the same distance at both ends, the parallel linkage 33 holds the angle of the coulters 21 and 22 relative to the ground and to one another so that for any vertical movement the coulters "lift" or rise up vertically, rather than pivoting upwards about an axis or tilting the coulters. This maintains movement of the minimum separation point 29 generally along a fixed vertical axis.

The collar 32 provides a pivotal mounting for the coulters 21 and 22, permitting the coulters to pivot about the shaft 31. Thus, if either one of the coulters strikes an obstacle, the two coulters will pivot together towards the right or the left, out of the way of the object. As has been indicated, the coulters are self-aligning and after they have cleared the obstacle, the coulters will restore to their normal orientation as they are drawn through the soil.

The reset mechanism 35 urges the coulters 21 and 22 downwardly relative to the frame into the soil. The reset mechanism 35 also exerts a downward force on the coulters, relative to the frame, to compensate for any upward movement of the coulters as the result of striking an obstacle.

While in exemplary embodiment, the coulter assembly 16 is described with reference to use with a moldboard plow, the coulter assembly can be used with any primary tillage apparatus. By way of illustration, a plurality of coulter assemblies 16 provided in accordance with the present invention are mounted on a primary tillage implement 10' having a plurality of subsoilers 11'. A coulter assembly 16 is mounted directly ahead of each subsoiler 11' to tear residue and clear a path ahead of its associated primary tillage tool in the manner described above for the moldboard plow.

I claim:

1. In combination, a primary tillage apparatus including a frame and a plurality of primary tillage tools mounted to the frame, the tillage tools being positioned to work soil being worked by the tillage apparatus, and
   a coulter assembly for each primary tillage tool including first and second coulters each mounted to extend rearwardly and outwardly from a center line parallel to the direction of travel thereby to form a V-shape symmetrical relative to the direction of travel, said first and second coulters being of substantially the same diameter and operating in substantial side-by-side relation with corresponding points on their periphery located at substantially the same operating depth and each coulter having a concave working surface and a serrated cutting edge, said concave working surfaces being directed outwardly away from one another and towards opposite sides of the tillage apparatus;
   mounting means mounting said first and second coulters to the frame and positioned directly forward of an associated primary tillage tool, said mounting means supporting said first and second coulters at an angle relative to one another such that the separation between said first and second coulters increases in a direction opposite to the direction of travel of the apparatus;
   the weight of the frame and the action of said tillage tools causing said coulters to penetrate the soil ahead of the tillage tool and to press into any residue encountered,
   said first and second coulters being constructed and arranged to grip and hold residue encountered by said coulters, drawing outwardly residue which is crossed simultaneously by both of said coulters, tearing apart the residue and clearing the residue to the sides and out of the path of the associated tillage tool.

2. The combination according to claim 1, wherein said first and second coulters of each coulter assembly are supported so that the point of minimum separation between said edges of said coulters is slightly above the point at which the coulters enter the ground.

3. The combination according to claim 2, wherein the separation between said edges of said coulters at said point of minimum separation is approximately one inch.

4. The combination according to claim 1, wherein said mounting means comprises a shaft coupled to the frame, a support member pivotally mounted on said shaft, and linkage means coupling said coulters to said support member.

5. The combination according to claim 4, wherein said linkage means comprises first and second parallel link members extending between said coulters and said support member for supporting said coulters.

6. The combination according to claim 5, wherein said first and second links have first ends pivotally connected to said support means, said linkage means further comprising a third link member pivotally interconnecting second end of said first and second link members for maintaining a fixed spacing between said link member second ends corresponding to the spacing between said link member first ends.

7. The apparatus of claim 4 wherein said shaft extends vertically and wherein said support member comprises a collar rotatably mounted on said shaft for permitting said coulter assembly to swivel about a vertical axis defined by said shaft.

8. The combination according to claim 1, wherein each of said primary tillage tools comprises a mold board plow.

9. The combination according to claim 1, wherein each of said primary tillage tools comprises a subsoiler.

10. The apparatus of claim 1 further comprising reset means for urging said coulter assembly downwardly while permitting said coulters to rise over obstructions encountered.

* * * * *